(12) United States Patent
Tabet et al.

(10) Patent No.: US 10,432,366 B2
(45) Date of Patent: Oct. 1, 2019

(54) CARRIER AGGREGATION WITH IMPROVED EFFICIENCY

(71) Applicant: Apple Inc., Cupertino, CA (US)

(72) Inventors: Tarik Tabet, Los Gatos, CA (US); Awais M. Hussain, Milpitas, CA (US); Rafael L. Rivera-Barreto, Santa Clara, CA (US); Matthias Sauer, San Jose, CA (US); Christian W. Mucke, Cupertino, CA (US); David Boettger, San Jose, CA (US); Moustafa M. Elsayed, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 184 days.

(21) Appl. No.: 15/584,251

(22) Filed: May 2, 2017

(65) Prior Publication Data

US 2017/0325123 A1 Nov. 9, 2017

Related U.S. Application Data

(60) Provisional application No. 62/331,303, filed on May 3, 2016.

(51) Int. Cl.
*H04L 5/00* (2006.01)
*H04W 72/04* (2009.01)
*H04W 88/08* (2009.01)

(52) U.S. Cl.
CPC .......... *H04L 5/001* (2013.01); *H04L 5/0064* (2013.01); *H04L 5/0087* (2013.01);
(Continued)

(58) Field of Classification Search
CPC ..... H04W 72/12; H04W 24/10; H04W 72/04; H04W 72/08; H04W 28/18; H04W 48/16;
(Continued)

(56) References Cited

U.S. PATENT DOCUMENTS

| 8,606,257 B2 | 12/2013 | Li | |
|---|---|---|---|
| 2016/0255630 A1* | 9/2016 | Etemad | H04L 5/003 370/329 |

(Continued)

OTHER PUBLICATIONS

NTT DOCOMO, INC.; "R2-161811; Modification of Network Requested CA Band Combination Retrieval for Intra-Band Non-Contiguous CA"; 3GPP TSG-RAN WG2 Meeting #93; R2-161811; St. Julian's, Malta; Feb. 15-19, 2016; 30 pages.

*Primary Examiner* — Hardikkumar D Patel
(74) *Attorney, Agent, or Firm* — Meyertons Hood Kivlin Kowert and Goetzel PC; Jeffrey C. Hood; Luke S. Langsjoen

(57) ABSTRACT

In some embodiments, a wireless device such as a user equipment (UE) may communicate with a base station using an advanced form of carrier aggregation. The UE may provide signaling to the network specifying a number P of downlink component carriers to be configured for use by the UE for downlink carrier aggregation and a number Q of uplink component carriers to be configured for use by the UE for uplink carrier aggregation. The UE can only utilize a lesser number M of downlink component carriers at any given time in downlink carrier aggregation and can only utilize a lesser number N of uplink component carriers at any given time in uplink carrier aggregation. Thus the UE may request the network to configure a greater number P and Q of downlink and uplink component carriers, respectively, than the UE can actually use at any instant of time.

18 Claims, 8 Drawing Sheets

(52) U.S. Cl.
CPC ......... *H04L 5/0098* (2013.01); *H04W 72/042* (2013.01); *H04W 88/08* (2013.01)

(58) Field of Classification Search
CPC ....... H04W 4/06; H04W 76/04; H04W 88/08; H04W 72/005; H04W 48/12; H04W 52/36; H04W 52/365; H04W 52/34; H04W 76/02; H04W 76/15; H04W 52/146; H04W 52/325; H04W 72/0413; H04W 72/1273; H04L 5/00; H04L 1/16; H04L 5/001; H04L 5/0064; H04L 5/0087; H04L 5/0098; H04L 5/0096; H04L 5/007; H04L 5/0057; H04L 5/0053; H04L 5/0032; H04L 5/0048; H04L 5/008; H04L 5/0055; H04L 1/1835; H04L 1/0026; H04L 1/1671; H04L 1/1887; H04L 5/0007

See application file for complete search history.

(56) References Cited

U.S. PATENT DOCUMENTS

2016/0262053 A1* 9/2016 Palm ....................... H04L 5/001
2017/0034840 A1* 2/2017 Mandil ................ H04W 24/10

\* cited by examiner

CARRIER AGGREGATION WITH IMPROVED EFFICIENCY

PRIORITY CLAIM

This application claims benefit of priority to Application No. 62/331,303 titled "Carrier Aggregation with Improved Efficiency", filed on May 3, 2016, which is hereby incorporated by reference as though fully and completely set forth herein.

FIELD

The present application relates to wireless devices, and more particularly to a system and method for performing carrier aggregation in wireless communications for with improved performance.

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Carrier Aggregation is a technique which allows a wireless device with multiple communication chains to communicate data using multiple component carriers. Improvements in the field would be desirable.

SUMMARY

Embodiments are presented herein of methods for configuring and performing cellular communication using carrier aggregation, and of devices configured to implement the methods.

According to the techniques described herein, a wireless device such as a user equipment (UE) may communicate with a base station according to a radio access technology, such as LTE, using an advanced form of carrier aggregation. The UE may provide signaling to the network specifying a number P of downlink component carriers to be configured for use by the UE for downlink carrier aggregation. The UE may also provide signaling to the network specifying a number Q of uplink component carriers to be configured for use by the UE for uplink carrier aggregation. In some embodiments, the UE can only utilize a lesser number M of downlink component carriers at any given time in downlink carrier aggregation and can only utilize a lesser number N of uplink component carriers at any given time in uplink carrier aggregation. Thus the UE may request the network to configure a greater number P and Q of downlink and uplink component carriers, respectively, than the UE can actually use at any instant of time.

The UE may perform various types of measurements on some or all of the P downlink component carriers and provide these measurement reports to the network. The network may use these measurements to selectively activate a subset of up to M of the P downlink component carriers. The network may then provide an indication to the UE of the subset of up to M of downlink component carriers that have been activated by the network.

The UE may determine timing advance information related to the Q uplink component carriers and provide this to the network. The network may use its own measurements on the UL carriers and the timing advance information to selectively activate a subset of up to N of the Q uplink component carriers. The network may then provide an indication to the UE of the subset of up to N of uplink component carriers that have been activated by the network.

In some embodiments, the UE may provide signaling (preference information) to the network indicating a preference for desired activation and/or deactivation of some of the downlink and/or uplink component carriers. The network may receive and use this preference information in determining which of the M and N downlink and uplink component carriers to activate.

The UE and the network may then communicate with carrier aggregation using the $\leq M$ downlink and $\leq N$ uplink component carriers that have been activated. The above methods may be performed repeatedly to select the best $\leq M$ downlink and $\leq N$ uplink component carriers based on current conditions.

The techniques described herein may be implemented in and/or used with a number of different types of devices, including but not limited to cellular phones, tablet computers, wearable computing devices, portable media players, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
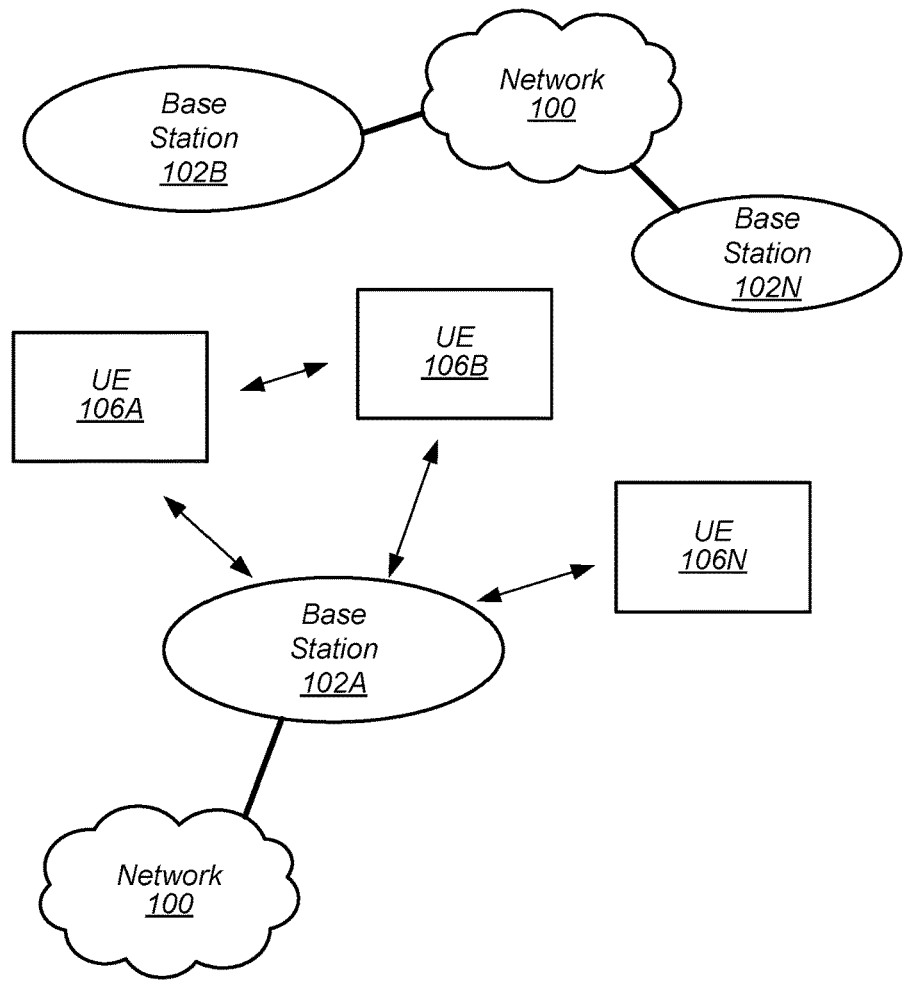
FIG. 1 illustrates an exemplary (and simplified) wireless communication system.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms may be used in the present disclosure.

3GPP: Third Generation Partnership Project
3GPP2: Third Generation Partnership Project 2
BLER: Block Error Rate (same as Packet Error Rate)
BER: Bit Error Rate
CC: Component Carrier
CE: Control Element
DL: Downlink
GBR: Guaranteed Bit Rate
GSM: Global System for Mobile Communications
LTE: Long Term Evolution
MAC: Media Access Control
MME: Mobility Management Entity
PCC: Primary Component Carrier
PCELL: Primary Cell (or Primary Component Carrier)
PER: Packet Error Rate
PHR: Power Headroom Report
RACH: Random Access Channel
RAT: Radio Access Technology
Rx: Receive
RSRP: Reference Signal Received Power
RSRQ: Reference Signal Received Quality
RRC: Radio Resource Control
SCC: Secondary Component Carrier
SCELL: Secondary Cell (or Secondary Component Carrier)
SINR: Signal to Interference-and-Noise Ratio
SIR: Signal to Interference Ratio
SNR: Signal to Noise Ratio
TA: Timing Advance
TAG: Timing Advance Group
Tx: Transmission
UE: User Equipment
UL: Uplink
UMTS: Universal Mobile Telecommunication System
VoLTE: Voice Over LTE Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
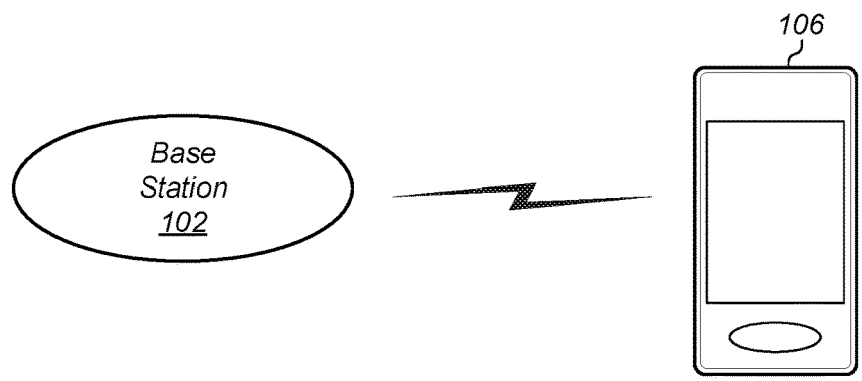
FIG. 2 illustrates a base station (BS) in communication with a user equipment (UE) device.

FIGS. 1 and 2—Communication System

FIG. 1 illustrates an exemplary (and simplified) wireless communication system. It is noted that the system of FIG. 1 is merely one example of a possible system, and embodiments of the invention may be implemented in any of various systems, as desired.

As shown, the exemplary wireless communication system includes a base station 102A which communicates over a transmission medium with one or more user devices 106A, 102B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In addition to "infrastructure mode" communication in which UEs 106 communicate with each other and other networks/devices indirectly by way of base stations 102, some UEs may also be capable of communicating in a "peer-to-peer" (P2P) or "device-to-device" (D2D) mode of communication. In such a mode, UEs 106 such as UE 106A and UE 106B may communicate directly with each other (e.g., instead of by way of an intermediate device such as base station 102A). For example, LTE D2D, Bluetooth ("BT", including BT low energy ("BLE"), Alternate MAC/PHY ("AMP"), and/or other BT versions or features), Wi-Fi ad-hoc/peer-to-peer, and/or any other peer-to-peer wireless communication protocol may be used to facilitate direct communications between two UEs 106.

Note that a UE 106 may be capable of communicating using any of multiple radio access technologies (RATs) or wireless communication protocols, and may be able to communicate according to multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N). The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As a further alternative, the UE 106 may include one or more radios which are shared between multiple wireless communication protocols, and one or more radios which are used exclusively by a single wireless communication protocol. Other configurations are also possible.

Figure 3:
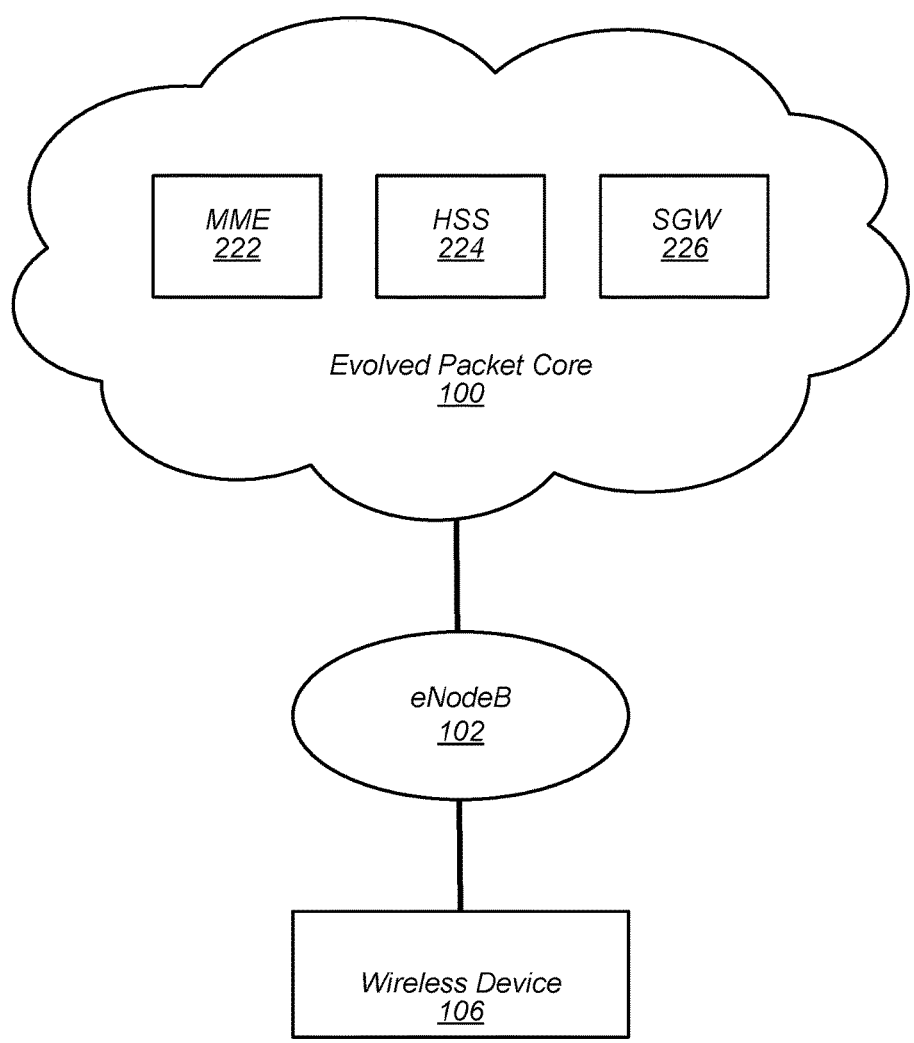
FIG. 3 illustrates an example wireless cellular communication network, according to some embodiments.

FIG. 3—Cellular Network

FIG. 3 illustrates an exemplary, simplified portion of a wireless communication system in an LTE network. Note that references to LTE herein may include present and/or future versions of LTE, for example including LTE-A.

As shown, the wireless device 106 may be in communication with a base station, shown in this exemplary embodiment as an eNodeB 102. For example, the wireless device 106 may utilize an evolved UMTS terrestrial radio access (E-UTRA) air interface to communicate with the eNodeB 102.

In turn, the eNodeB may be coupled to a core network, shown in this exemplary embodiment as an evolved packet core (EPC) 100. As shown, the EPC 100 may include mobility management entity (MME) 222, home subscriber server (HSS) 224, and serving gateway (SGW) 226. The EPC 100 may include various other devices and/or entities known to those skilled in the art as well.

The term "network" as used herein may refer to one or more of the base station 102, the MME 222, the HSS 224, the SGW 226 or other cellular network devices not shown. An operation described as being performed by "the network" may performed by one or more of the base station 102, the MME 222, the HSS 224, the SGW 226 or other cellular network devices not shown.

Figure 4:
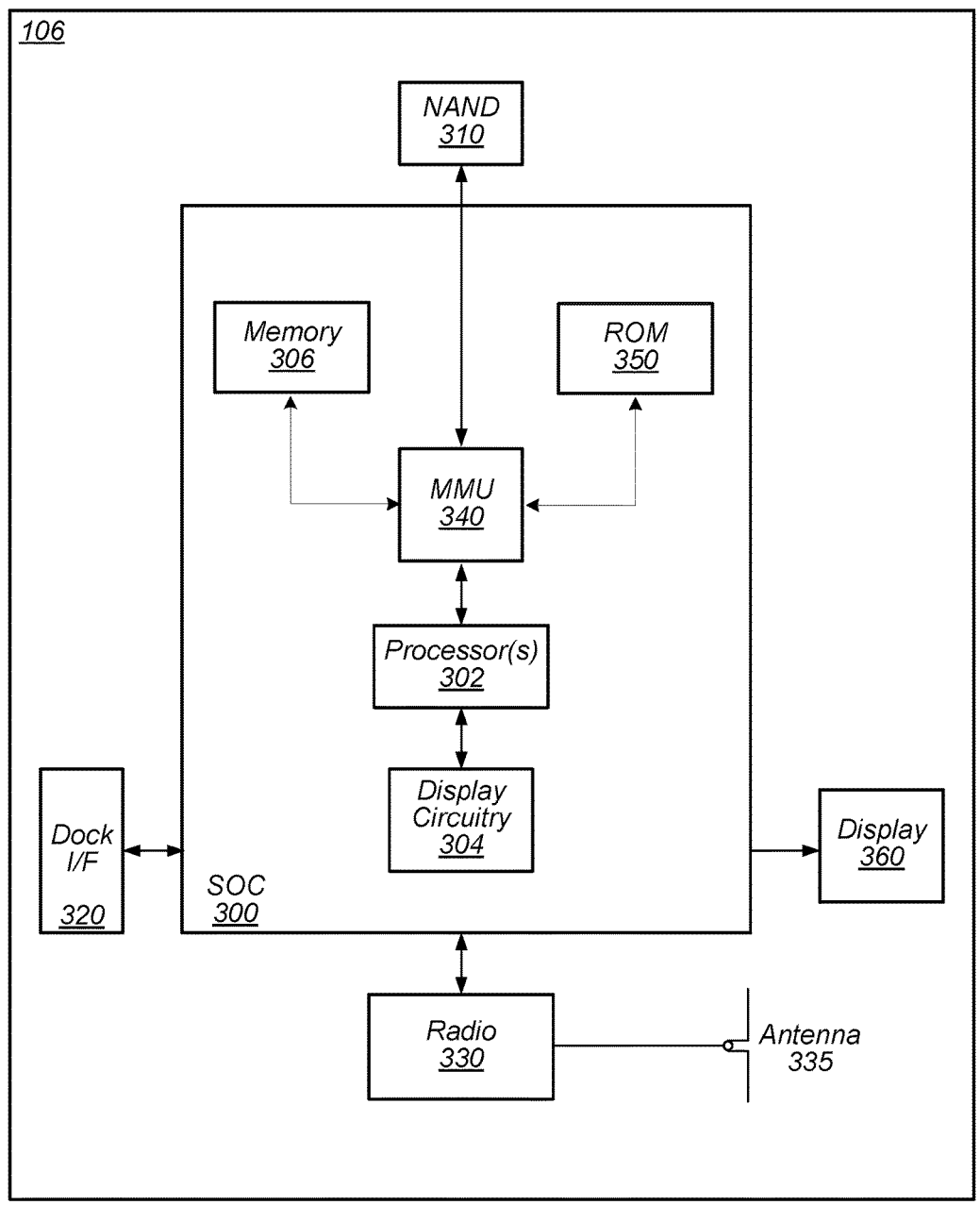
FIG. 4 illustrates an exemplary block diagram of a UE.

FIG. 4—Exemplary Block Diagram of a UE

FIG. 4 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry or radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including Flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

The UE device 106 may include at least one antenna 335, and in some embodiments multiple antennas, for performing wireless communication with base stations and/or other devices. For example, the UE device 106 may use antenna 335 to perform the wireless communication. As noted above, the UE may be configured to communicate wirelessly using multiple wireless communication standards in some embodiments.

As described further subsequently herein, the UE 106 may include hardware and software components for implementing features for using carrier aggregation in conjunction with cellular communication, such as those described herein with reference to FIGS. 6-10. For example, the radio (wireless communication circuitry) 330 may comprise a plurality M of receive (Rx) chains for handling a plurality M of received downlink component carriers simultaneously. The radio 330 may also comprise one or more transmit (Tx) chains for transmitting a plurality N of component carriers substantially simultaneously, it being noted that in some embodiments one Tx chain may be used transmit two or more uplink component carriers sequentially.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition), the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIGS. 6-10.

Figure 5:
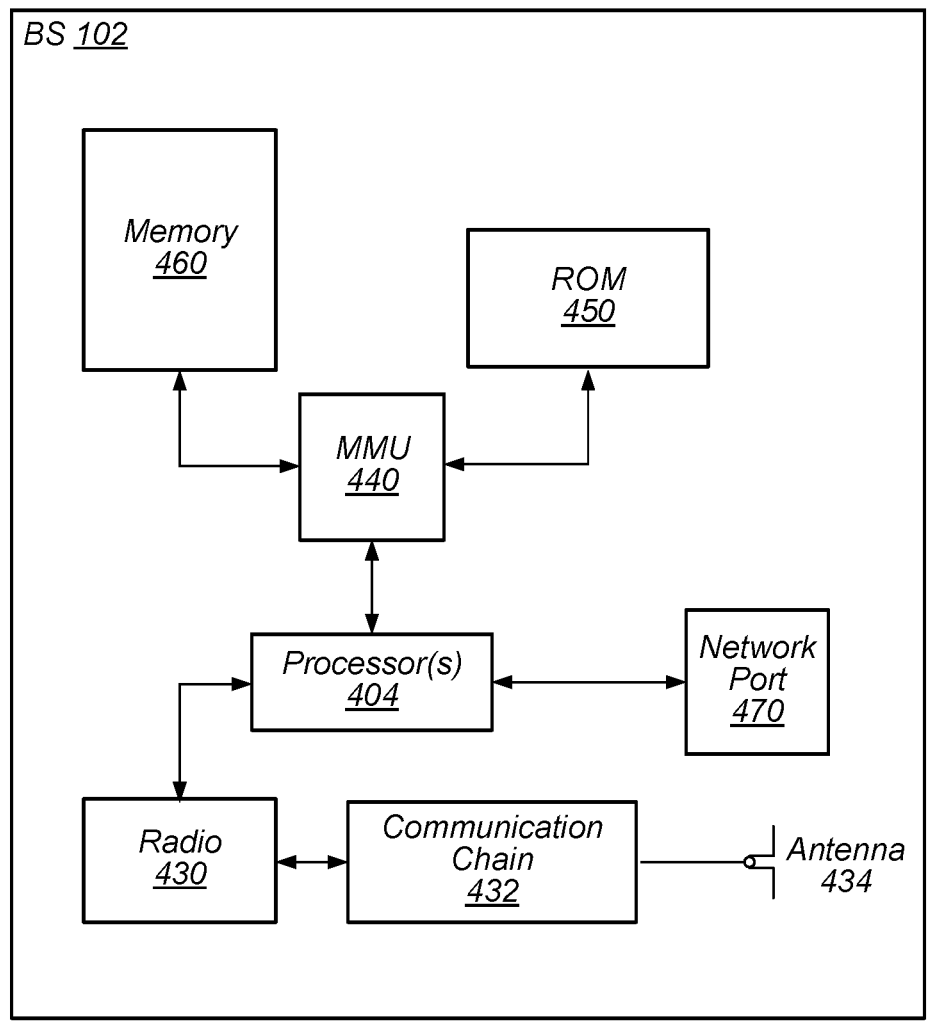
FIG. 5 illustrates an exemplary block diagram of a BS.

FIG. 5—Exemplary Block Diagram of a Base Station

FIG. 5 illustrates an exemplary block diagram of a base station 102. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, etc.

As described further subsequently herein, the BS 102, as well as various of the network devices in FIG. 3 or otherwise not shown, may include hardware and software components for implementing features for using carrier aggregation in conjunction with cellular communication, such as those described herein with reference to, inter alia, FIGS. 6-10. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the BS 102, in conjunction with one or more of the other components 430, 432, 434, 440, 450, 460, 470 may be configured to implement part or all of the features described herein, such as the features described herein with reference to, inter alia, FIGS. 6-10.

Figure 6:
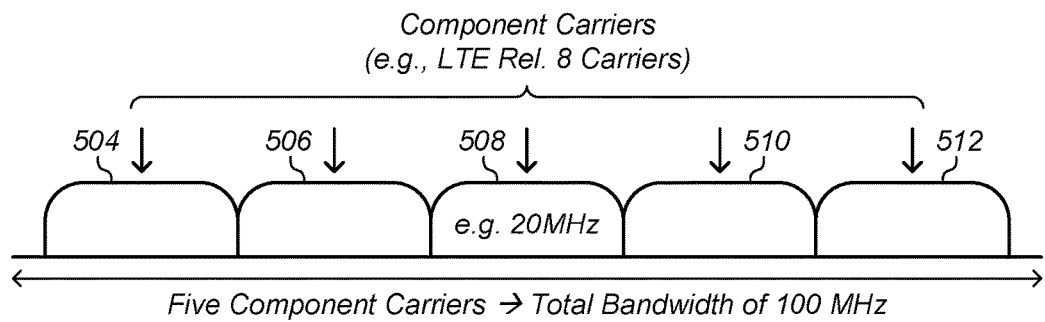
FIG. 6 illustrates an exemplary carrier aggregation scheme.

FIG. 6—Carrier Aggregation

In a typical communication scenario that does not involve carrier aggregation, a single component carrier is used which may have a channel width of up to 20 MHz. Carrier aggregation is a scheme in which multiple carriers (e.g., frequency channels) may be used together for wireless communication with a UE according to a wireless communication technology. FIG. 6 illustrates one exemplary carrier aggregation scheme (e.g., which may be used in accordance with the LTE radio access technology) which may be used in accordance with other aspects of this disclosure, such as with respect to the methods described herein.

As shown, carrier aggregation may be introduced to utilize a plurality of carriers together for communication, and hence to provide greater bandwidth than 20 MHz. In the illustrated scheme, up to five component carriers (carriers 504, 506, 508, 510, 512) may be aggregated for a single user device (such one of the UEs 106 illustrated in and described with respect to FIGS. 1-3). Each component carrier may use a channel width of up to 20 MHz. As one possibility, each component carrier may be an LTE release 8 carrier. Thus, according to the exemplary scheme, a UE may be allocated up to 100 MHz of bandwidth. In many instances, a UE which utilizes such a carrier aggregation scheme may have greater throughput than without such a scheme.

In many cases, component carriers may utilize adjacent frequency channels. However, it should be noted that it is also possible to implement carrier aggregation utilizing non-contiguous frequency channels, potentially including non-contiguous frequency channels within the same frequency band, and/or frequency channels within different frequency bands.

It should be noted that while the exemplary scheme illustrated in FIG. 6 and the associated description are provided by way of example as one possible manner of implementing carrier aggregation, they are not intended to be limiting to the disclosure as a whole. Numerous alternatives to and variations of the details thereof are possible and should be considered within the scope of the present disclosure. For example: carrier aggregation schemes may be implemented in conjunction with other wireless communication technologies; carriers according to other LTE releases or other radio access technologies altogether may be used; carriers having different channel widths may be used; different numbers of component carriers may be supported; and/or any of numerous other alternatives to and variations of the illustrated scheme are also possible.

Figure 7:
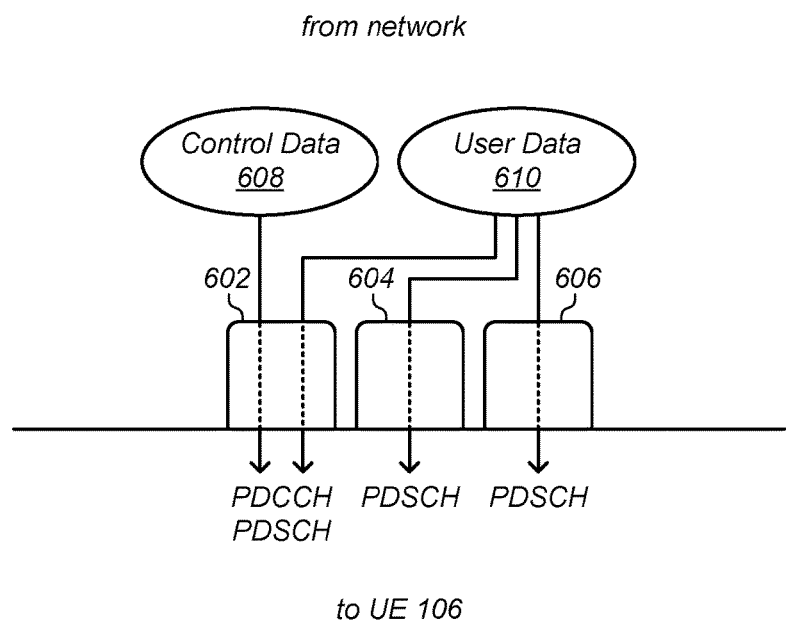
FIG. 7 illustrates operation of cross-carrier scheduling.

FIG. 7—Cross-Carrier Scheduling

For systems which implement carrier aggregation, various control schemes/mechanisms are possible. As one possibility, an independent cell may be implemented on each downlink component carrier, for example by providing a control channel with data scheduling and other control features for each cell on the component carrier for that cell.

As another possibility, some or all control functions may be centralized. For example, a "primary cell" might be implemented on one component carrier, referred to as the primary component carrier, while "secondary cells" might be implemented on any additional component carriers, referred to as secondary component carriers. The control functions may be centralized such that some or all control information for the secondary cells (secondary component carriers) is communicated by way of the primary cell (primary component carrier). Thus a common scheme to implement carrier aggregation uses one primary cell (Pcell), also referred to as a primary component carrier, and where the other supplementary component carriers are referred to as secondary cells (Scells), also referred to as secondary component carriers.

Such a scheme may be referred to as "cross-carrier scheduling", and FIG. 7 illustrates one such exemplary scheme (e.g., which may be used in accordance with the LTE radio access technology). It should be noted that while the exemplary scheme illustrated in FIG. 7 and the associated description are provided by way of example as one possible manner of implementing a cross-carrier scheduling mechanism, they are not intended to be limiting to the disclosure as a whole. Numerous alternatives to and variations of these exemplary details are possible and should be considered within the scope of the present disclosure.

As shown, in the exemplary scheme a user device (e.g., a UE 106 such as illustrated in and described with respect to FIGS. 1-3) may have three active carriers as part of its connection to a network (e.g., by way of one or more base stations 102 such as illustrated in and described with respect to FIGS. 1-3), which may be implemented as a primary cell 602 and two secondary cells 604, 606. The network may provide control data 608 (e.g., for scheduling user data communications, performing mobility related functions, etc.) for all three cells by way of a control channel of the primary cell 602. For example, the control data 608 may be communicated by way of a physical downlink control channel (PDCCH) of the primary cell 602.

The network may provide user data 610 (e.g., application data for networking applications such as web browser applications, email applications voice call applications, video chat applications, game applications, etc.) to the UE 106 on any or all of the cells 602, 604, 606. For example, various portions of the user data 610 may be communicated by way of a physical downlink shared channel (PDSCH) of each of the primary cell 602 and the secondary cells 604, 606.

Thus, cross-carrier scheduling may be used in conjunction with carrier aggregation to centralize (at least a portion of) control communications on one cell. This technique may be used in many instances for infrastructure mode communications between a UE and a network, such as illustrated in the exemplary scheme of FIG. 7. In addition, cross-carrier scheduling may be used in conjunction with carrier aggregation to provide network-controlled hybrid infrastructure mode/device-to-device communication between two UEs 106. Various aspects of such a technique are further described herein below with respect to the methods described herein.

A component carrier may be first configured through RRC signaling. Once configured, the component carrier can be activated or deactivated through MAC (Media Access Control) signaling.

Carrier Aggregation Complexity Issues

The support of multiple component carriers comes at a cost in terms of baseband and RF complexity, and also has an impact on battery life. Moreover, carrier aggregation utilization may not be optimized, e.g., the UE may be configured with 3 component carriers, but only one or two may be used depending on current traffic patterns and radio conditions. Also, the gain from carrier aggregation does not necessarily increase linearly with the number of component carriers activated. As noted above, the gain may be limited by the current radio conditions and traffic patterns, and may also be impacted by the network load. Hence improvements in the field are desired to alleviate at least some of the complexity/battery drainage impact of carrier aggregation while improving its utilization (both in UL and DL).

Improved Carrier Aggregation

In order to reduce the complexity of the LTE transceiver, in some embodiments the UE may be configured to support up to M component carriers (CCs) in the downlink (DL) and up to N component carriers in the uplink (UL). For example, M=3 and N=2, i.e., the UE may be configured to support 3 component carriers in DL and 2 component carriers in UL. The numbers of component carriers supported by the UE, M and N, may be designed based on the network configuration and also based on the throughput requirements of the category of UEs. The category of UEs may range from the high end, such as smart phones to a lower capability category, e.g., a wearable category for wearable devices such as a smart watch. For example, higher end categories of UEs may support more component carriers than lower end UEs.

In the present disclosure, P* may specify the number of component carriers supported by the base station (eNB) for the UE in the DL and Q* may specify the number of component carriers supported by the base station for the UE in the UL. The base station may configure the UE with a number P out of P* component carriers in the DL and a number Q out of Q* of component carriers in the UL for possible usage by the UE. However, at any instant of time, only up to M component carriers (in DL) and N component carriers (in UL) may be activated. The choice of these M out of P component carriers and N out of Q component carriers may be determined by the network using different metrics and considerations, as explained further below. Note that there may be additional restrictions as declared by the UE in its capabilities as to which combinations of component carriers it can support simultaneously. For ease of discussion, this selection is presented as M out of P in DL and N out of Q in UL.

The UE benefits may include increased throughput/latency and better power savings. For the network, the benefits may include increased capacity, since this flexibility will be used by the network for better scheduling and offloading. More specifically, the traffic demanded of the network may not be able to be scheduled uniformly onto all M secondary carriers, such that the network capacity benefits from dynamically reassigning some users away from heavily loaded carriers onto more lightly loaded carriers. The inability of the network to schedule traffic uniformly on all M secondary carriers may arise due to traffic imbalances. These traffic imbalances may occur due to an installed base of legacy devices that cannot support all M secondary carriers simultaneously and/or may not support some of those carriers at all (e.g., carriers in RF bands that were never designed into those devices).

Figure 8:
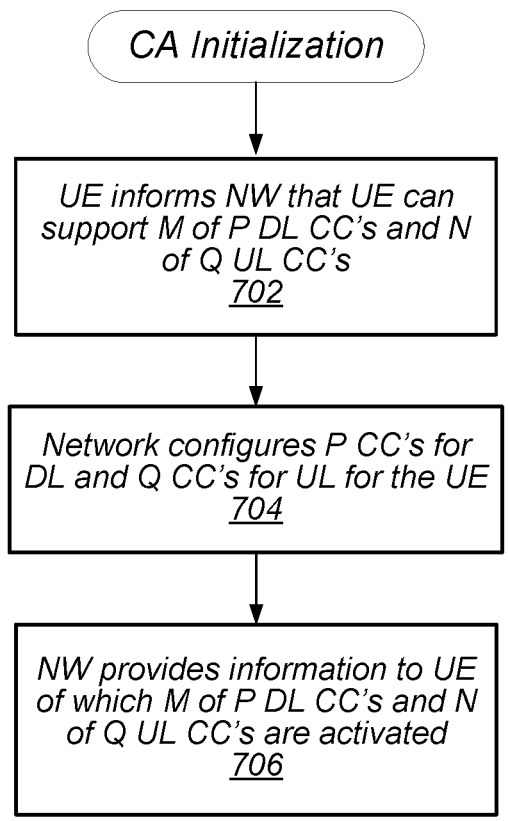
FIG. 8 is a flowchart illustrating initialization operation for carrier aggregation.

FIG. 8—Carrier Aggregation Initialization and Operation

FIG. 8 illustrates an embodiment of a method whereby carrier aggregation is initialized for a UE device and then begins operation.

In 702 the UE informs the network (NW) that the network should configure or set up a number P of potential downlink component carriers and a number Q of potential uplink component carriers for usage by the UE in carrier aggregation. In 702 the UE also informs the network that the UE can only support a lesser number M of active downlink component carriers, where M is less than (or equal to) P, and can only support a lesser number N of active uplink component carriers, wherein N is less than (or equal to) Q. Thus the UE provides signaling to the network that the network should configure a maximum of P downlink component carriers for use by the UE, and further that the UE can only actively support a lesser number M of downlink component carriers at any given time, and that the network should configure a maximum of Q uplink component carriers for use by the UE, and further that the UE can only actively support a lesser number N of uplink component carriers at any given time. As one example, the UE may signal the network that it can support 5 downlink component carriers, but at any time only 3 of those 5 should be active. Similarly, the UE may signal the network that it can support 3 uplink component carriers, but at any time only 2 of those 3 should be active. The UE may provide this signal in the exchange of UE capability information at the beginning of the RRC connection.

In 704 the network configures P downlink component carriers and Q uplink component carriers for the UE. Thus the network configures a greater number P and Q of downlink and uplink component carriers for the UE than the UE is capable of using at any given time.

In 706 the network may operate to activate (or allocate) M of the P downlink component carriers for use by the UE and activate N of the Q uplink component carriers. The network may select the subset M downlink component carriers from the total P downlink component carriers based on various criteria, including measurements provided by the UE and preferences indicated by the UE. The manner in which the network decides to selectively activate M of the P downlink component carriers is discussed in greater detail with respect to the flowchart of FIG. 9. Similarly, the network may select the subset N uplink component carriers from the total Q uplink component carriers based on various criteria, including measurements, preferences indicated by the UE, and timing advance information that may be determined by the network and/or timing estimate information supplied by the UE. The manner in which the network decides to selectively activate N of the Q uplink component carriers is discussed in greater detail with respect to the flowchart of FIG. 10.

Operation of 706 (including the methods described in the flowcharts of FIGS. 9 and 10) may be repetitively performed during communication, such that the network and the UE may utilize the "best" subsets M and N of downlink and uplink component carriers, respectively, based on current conditions. For example, the network may operate to select different subsets M and/or N of downlink and uplink component carriers, respectively, at different times, as conditions warrant. As one example, the network may operate to select different subsets of downlink and/or uplink component carriers at different times to move the communications load to less utilized carriers, dependent on current conditions.

Figure 9:
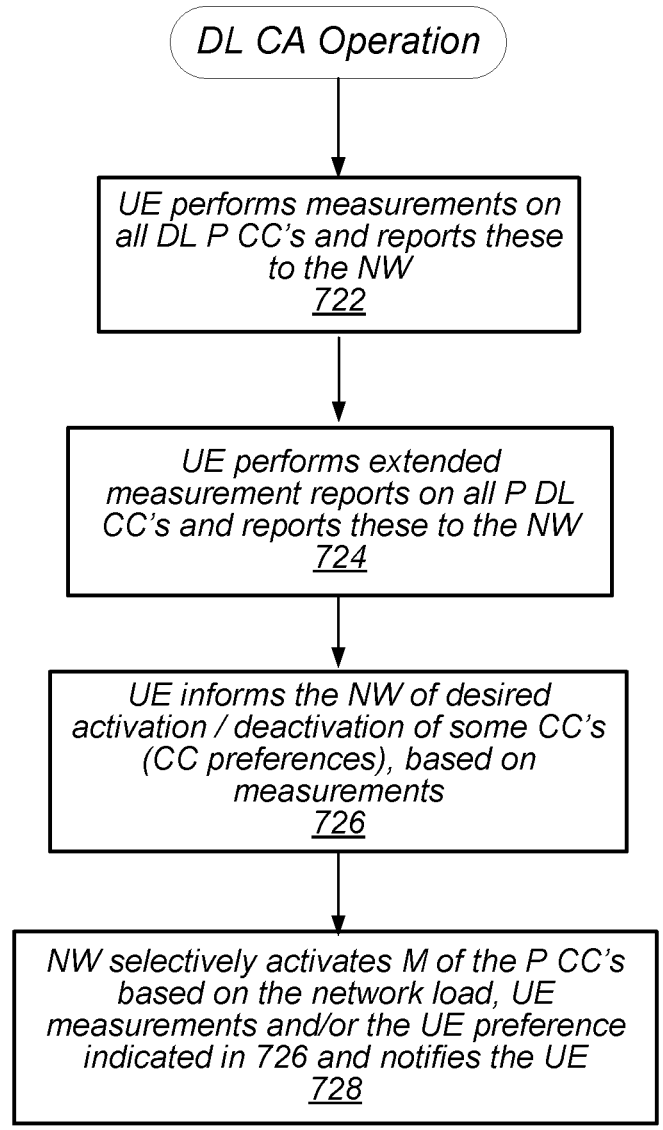
FIG. 9 is a flowchart illustrating operation of downlink carrier aggregation, according to some embodiments.

FIG. 9—Downlink Carrier Aggregation

FIG. 9 is a flowchart diagram illustrating some embodiments of downlink carrier aggregation operation. For downlink carrier aggregation, the component carriers for the UE may be configured as follows. As noted above, the network may have configured the UE for potential use of a pool of P downlink component carriers, where a subset M of these are selected for use by the UE.

At 722 the UE may perform measurements on a subset or all of the downlink P component carriers and report these measurements to the network. If only the primary component carrier (PCC) is currently active, i.e., only 1 of the M component carriers is active, the UE can re-use any receive chain of the remaining M−1 component carriers to measure the (P−M) component carriers. The term "measure" or "measurements" here refers to Reference Signal Received Power/Reference Signal Received Quality (RSRP/RSRQ) measurements, channel state information, load measurements, and/or other types of measurements, etc.

If all of the receive chains of the UE are activated, then the UE may use a time period of low inactivity period to measure the (P−M) component carriers. Alternatively, the network can allocate measurement gaps in the PCC for these measurements.

Here it is noted that the UE may comprise only M (e.g., 3) RF chains, but may be expected to measure a greater number P (e.g., 5) component carrier channels. In some embodiments, different ones of the RF chains may operate in a multiplexed fashion to perform this greater number of measurements.

The UE may then report these measurements to the network. Based on the network load and these quality metrics (the received measurements), the network (e.g., the network scheduler) may decide the component carriers to activate for downlink carrier aggregation, as indicated in 728.

As shown in 724, the UE may perform extended measurement reports on some or all of the P downlink component carriers and report these to the network. These extended measurement reports may comprise additional channel quality indicator (CQI) measurements on certain sub-bands of at least some of the component carriers, e.g., one or more of the currently deactivated component carriers.

In 726 the UE may indicate to the network a preference for activation/deactivation of some of the downlink component carriers. Thus the UE may indicate, based on its measurements, the downlink component carriers that the UE would prefer to be activated or deactivated. This preference could be based on the throughput needed by the UE, the radio conditions of the component carriers (e.g., the UE may choose the best component carrier(s) in terms of RSRPs), current load conditions, coexistence issues, and other factors. The UE may provide this preference information in a Media Access Control (MAC) control element (CE).

As one example, in 726 the UE may choose the combinations of downlink component carriers that has the minimum impact on the RF in terms of coexistence. For example, the UE may determine that use of a particular downlink component carrier results in RF interference with its Bluetooth or Wi-Fi radio, or presents other coexistence problems. In this instance, in 726 the UE may indicate to the network that this particular downlink component carrier should not be activated, or alternatively the UE may indicate a preference for other ones of the downlink component carriers.

In 728 the network may selectively activate a subset M (or less) of the total number P of downlink component carriers configured for the UE. This selective activation may be based on various criteria, such as the current network load as observed by the network, the UE measurements received by the UE in 722 and/or 724, and/or the preferences indicated by the network in 726.

It is noted that not each of 722-726 may be performed in each iteration of the method. For example, in some instances, the UE may only perform normal RSRP/RSRQ measurements in 722 and provide these to the network, and in 728 the network may selectively activate M of the P downlink component carriers based on network load and these measurements. In other words, the extended measurements in 724 may not be performed/reported in some iterations.

In other instances, the UE may perform both the normal RSRP/RSRQ measurements in 722 and the enhanced measurements in 724 and provide these both to the network, and in 728 the network may selectively activate M of the P downlink component carriers based on network load and these sets of measurements.

In some embodiments, the UE may perform one or both of the measurements in 722 and 724 and itself determine a preferred set of downlink component carriers, or information regarding which component carriers should be activated/deactivated, and provides this to the network in 726. In these embodiments, the UE may also provide its actual measurements to the network as well, or alternatively may provide only its preferences in 726 and may forgo providing the actual measurements to the network for at least a few iterations.

Figure 10:
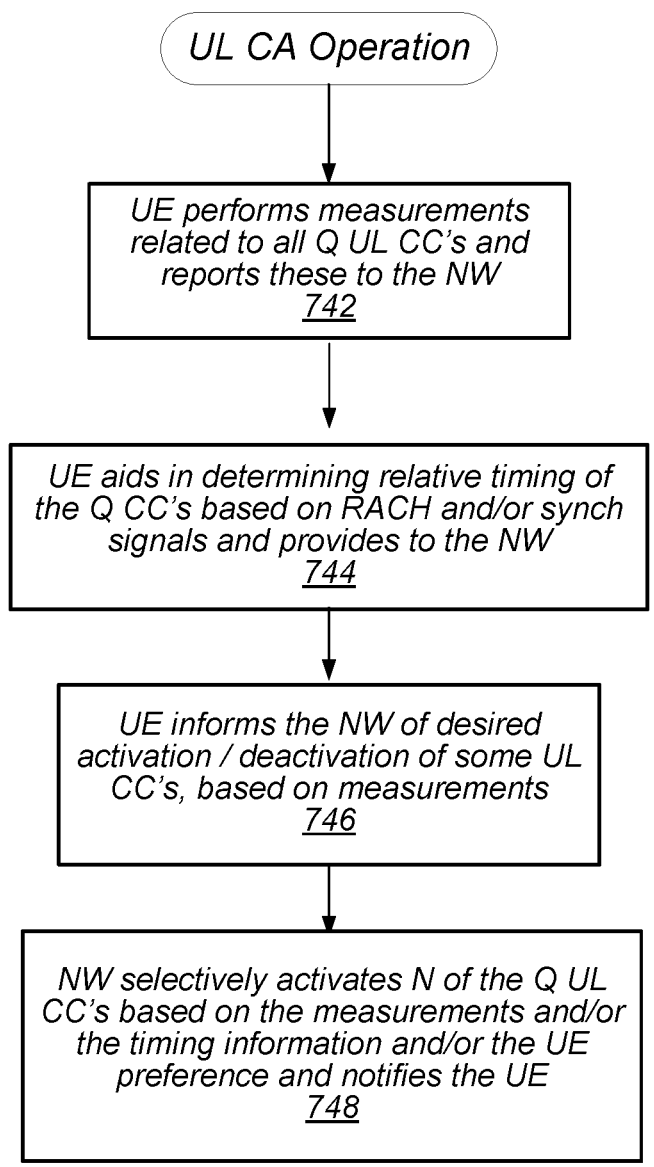
FIG. 10 is a flowchart illustrating operation of uplink carrier aggregation, according to some embodiments.

FIG. 10—Uplink Carrier Aggregation

FIG. 10 is a flowchart diagram illustrating some embodiments of uplink carrier aggregation operation. For uplink carrier aggregation, the uplink component carriers for the UE may be configured as follows. As noted above, the network may have configured the UE for potential use of a pool of Q uplink component carriers, where a subset M of these are selected for use by the UE.

Similar to downlink carrier aggregation described above, the network may activate the uplink component carriers, e.g., may select N uplink component carriers out of the total possible Q uplink component carriers, based on certain measurements, such as path loss, which may be derived from a RSRP measurement.

In 742 the UE may perform various measurements on some or all of the Q uplink component carriers and report these measurements to the network. For example, when a component carrier is activated, the network may use other measurements and reports such as a Power Headroom Report (PHR), Tx Power, or Uplink Block Error Rate (BLER), to decide whether to keep the component carrier or to change it.

One important element in UL carrier aggregation is the timing advance (TA) information. The timing advance is a negative offset applied at the UE between the start of a received downlink subframe and a transmitted uplink subframe. This offset at the UE is used to ensure that the downlink and uplink subframes are synchronized at the base station (eNodeB) The base station may have knowledge of which component carriers are in the same timing advance group (TAG). Uplink component carriers may be in the same TAG when they are being communicated to base stations that are co-located, and hence have approximately the same propagation delay. The base station (eNB) may determine which component carriers chosen for the UE are within the same timing advance group (TAG) and use this information in selecting which uplink component carriers to activate/deactivate. However, for component carriers that are not co-located, the base station may not have information regarding the relative timing differences of these non-co-located component carriers.

In 744 the UE may determine the relative timing of a subset or all of the Q uplink component and provide this information to the network for use by the network in selecting component carriers to activate/deactivate. In one embodiment, the UE may perform a RACH (random access channel signaling) under network command on a subset or all of the Q component carriers in a sequential manner in order for the network to determine the timing advance information. However, performing such a RACH on the Q component carriers is expensive in terms of bandwidth and power. In other embodiments, the UE determines the relative timing of some or all of the Q component carriers in the corresponding downlink based on the PSS/SSS synchronization signals. In other words, based on the timing of these received synchronization signals in the downlink, the UE can determine the relative timing differences of these uplink component carriers. This is a less expensive solution in terms of NW resources and power consumption. This information may be reported to the NW in addition to the preferred component carriers in 748.

In 746 the UE may inform the network, or indicate to the network, a preference for activation/deactivation of some of the uplink component carriers. Thus the UE may indicate, based on its measurements, the uplink component carriers that the UE would prefer to be activated or deactivated. This preference could be based on the uplink throughput needed by the UE, the various measurements performed by the UE, the relative timing of the uplink component carriers as determined by the UE, current load conditions, coexistence issues, and other factors. The UE may provide this preference information in a Media Access Control (MAC) control element (CE) to the network.

In 748 the network may selectively activate N of the Q uplink component carriers based on any one or more of the above sources of information, e.g., based on one or more of the above measurements in 742, the information on timing advance groups (TAGs) determined by the network, the relative timing information provided by the UE in 744, and/or the component carrier preference information provided by the UE in 746.

Similar to FIG. 9 described above, it is noted that not each of 742-748 may be performed in each iteration of the method. For example, in some instances, the UE may perform various measurements in 742 and provide these to the network, and in 748 the network may selectively activate N of the Q uplink component carriers based on network load and these measurements, as well as possibly timing advance information.

In some embodiments, the UE may perform various of the measurements in 742 and determine relative timing information in 744, and based on some combination of this information the UE may itself determine a preferred set of downlink component carriers, or may determine information regarding which uplink component carriers should be activated/deactivated, and provides this to the network in 748. In these embodiments, the UE may also provide its actual measurements to the network as well, or alternatively may provide only its preferences in 748 and may forgo providing the actual measurements to the network for at least a few iterations.

In summary, the UE may operate to assist the network in selecting a subset of the uplink component carriers within the same TAG, where the chosen subset of component carriers may be the most optimal in terms of timing similarity, e.g., may have the most similar propagation delays.

UE and Network Enhancements

The network and/or the UE which implement at least some embodiments of the techniques described herein may have at least the following enhancements.

The UE may have the additional capability of providing an indication to the network that it supports M out of P and N out of Q component carriers. The UE may be configured to use a reserved MAC CE to inform the network of the desired activation/deactivation of some component carriers.

The UE may be configured to perform extended measurement reports to allow the UE to measure the P component carriers. In other words, the UE may have the ability to measure a greater number of component carriers than it can actually use at any given time, and may be able to perform an extended set of measurements on these component carriers which have not traditionally been performed.

In determining uplink component carriers, the UE may be configured to use reserved MAC CE/RRC signaling to provide timing advance information to the network, e.g., information on the relative timing of various uplink component carriers.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment device (UE), comprising:
a radio, comprising one or more antennas configured for wireless communication on a cellular network;
a processing element operably coupled to the radio;
wherein the UE is configured to:
perform measurements on one or more uplink component carriers;
provide signaling to the network specifying a number Q of uplink component carriers to be configured for use by the UE for uplink carrier aggregation, specifying that the UE can only utilize a lesser number N of uplink component carriers at any given time in uplink carrier aggregation, and specifying a preference for one or more of the Q uplink component carriers based at least in part on results of the measurements performed on the one or more uplink component carriers;
determine timing information on at least one of the Q uplink component carriers and provide the timing information to the network, wherein the timing information is useable by the network to assist in deciding which N of the Q uplink component carriers to be activated;
receive from the network, an indication of a subset of up to N uplink component carriers, of the Q uplink component carriers, that have been activated by the network, wherein N is less than Q, and wherein the N uplink component carriers have been selected by the network based at least in part on the preference for one or more of the Q uplink component carriers provided by the UE; and
transmit, to the network, information on the N uplink component carriers that have been activated by the network.

2. The UE of claim 1,
wherein the timing information comprises timing advance (TA) information specifying an offset that is usable by the network to ensure that downlink and uplink subframes are synchronized.

3. The UE of claim 1,
wherein the timing information comprises relative timing of at least two of the Q uplink component carriers, wherein the timing information is determined by the UE based on corresponding received downlink synchronization signals.

4. The UE of claim 1, wherein the UE is further configured to receive indications of different subsets of N uplink component carriers selected from the Q uplink component carriers, wherein the indications of the different subsets of N uplink component carriers are received at different times dependent on current conditions.

5. The UE of claim 1,
wherein in providing the signaling the UE is configured to specify a set of Q component carriers for uplink communication from a pool of component carriers supported by the network.

6. The UE of claim 1,
wherein in providing the signaling the UE is configured to specify one or more additional restrictions as to which combinations of component carriers can be simultaneously activated.

7. A wireless user equipment device (UE), comprising:
a radio, comprising one or more antennas configured for wireless communication on a cellular network;
a processing element operably coupled to the radio;
wherein the UE is configured to:
provide signaling to the network specifying a number P of downlink component carriers to be configured for use by the UE for downlink carrier aggregation, and specifying that the UE can only utilize a lesser number M of downlink component carriers at any given time in downlink carrier aggregation;
perform measurements on the P downlink component carriers and provide the measurements to the network, wherein the measurements are useable by the network to assist in deciding which M of the P downlink component carriers to be activated;
provide, to the network, preference information on preferred activation and/or deactivation of one or more of the P downlink component carriers;
receive, from the network, an indication of a subset up to M of downlink component carriers, of the P downlink component carriers, that have been activated by the network, wherein M is less than P, wherein the indication received from the network of the subset M of the downlink component carriers that have been activated by the network is based at least in part on the preference information provided by the UE; and
receive, from the network, communication on the M downlink component carriers that have been activated by the network.

8. The UE of claim 7,
wherein the preference information indicates a preference for deactivation of at least one downlink component carrier based on coexistence interference of at least one non-cellular radio of the UE.

9. The UE of claim 7, wherein the UE is further configured to receive indications of different subsets of M downlink component carriers selected from the P downlink component carriers, wherein the indications of the different subsets of M downlink component carriers are received at different times dependent on current conditions.

10. The UE of claim 7, wherein the UE is further configured to receive indications of different subsets of M downlink component carriers at different times dependent on current conditions.

11. The UE of claim 7,
wherein in providing the signaling the UE is configured to specify a set of P component carriers for downlink communication from a pool of component carriers supported by the network.

12. A base station (BS), comprising:
a radio, comprising one or more antennas configured for wireless communication;
a processing element operably coupled to the radio;
wherein the base station is configured to:
receive signaling from a user equipment device (UE) specifying a number P of downlink component carriers to be configured for use by the UE for downlink carrier aggregation, and that the UE can only utilize a lesser number M of downlink component carriers at any given time in downlink carrier aggregation;
receive, from the UE, preference information on preferred activation and/or deactivation of one or more of the P downlink component carriers;
receive signaling from the UE specifying a number Q of uplink component carriers to be configured for use by the UE for uplink carrier aggregation, and that the UE can only utilize a lesser number N of uplink component carriers at any given time in uplink carrier aggregation;

select a subset M of the P downlink component carriers for activation and use by the UE based on current conditions and the preference information received from the UE;
select a subset N of the Q uplink component carriers for activation and use by the UE based on current conditions, wherein the current conditions comprise a current network load of a network and measurements of one or more of the P downlink component carriers and the Q uplink component carriers provided by the UE;
provide, to the UE, an indication of the selected subset M of the P downlink component carriers that have been activated;
provide, to the UE, an indication of the selected subset N of the Q uplink component carriers that have been activated by the network;
transmit, to the UE, communication on the selected subset M of downlink component carriers that have been activated by the network; and
receive, from the UE, information on the selected subset N of uplink component carriers that have been activated by the network.

13. The base station of claim 12,
wherein the current conditions comprise timing advance information provided by the UE.

14. The base station of claim 12, wherein the base station is further configured to:
determine which of the Q component carriers are within a same timing advance group (TAG), and use this information in selecting which N uplink component carriers to activate.

15. The base station of claim 12,
wherein the preference information indicates a preference for deactivation of at least one downlink component carrier based on coexistence interference of at least one non-cellular radio of the UE.

16. The base station of claim 12,
wherein the current conditions comprise a current network load and measurements of each of the P downlink component carriers provided by the UE.

17. The base station of claim 12,
wherein the current conditions comprise a current network load and measurements of each of the Q uplink component carriers provided by the UE.

18. The UE of claim 1,
wherein the measurements comprise one or more of:
power headroom;
transmission power; and
uplink block error rate.

* * * * *